United States Patent
Cotton

[11] Patent Number: 5,400,373
[45] Date of Patent: Mar. 21, 1995

[54] ASSEMBLY FIXTURE AND METHOD FOR FABRICATING GRIDS

[75] Inventor: Robert H. Cotton, Eastover, S.C.

[73] Assignee: Westinghouse Electric Corporation, Pittsburgh, Pa.

[21] Appl. No.: 242,822

[22] Filed: May 16, 1994

[51] Int. Cl.⁶ .......................................... G21C 21/00
[52] U.S. Cl. ..................... 376/260; 219/158; 269/41; 269/119; 29/723; 976/DIG. 81
[58] Field of Search ............................ 376/260, 261; 976/DIG. 81; 269/40, 41, 111, 118, 119, 287, 312, 909; 219/158, 161; 29/723, 906

[56] References Cited

U.S. PATENT DOCUMENTS

| 3,379,617 | 4/1968 | Andrews et al. | 376/442 |
| 3,379,619 | 4/1968 | Andrews et al. | 376/439 |
| 4,492,844 | 1/1985 | Kobuck et al. | 376/261 |

Primary Examiner—Daniel D. Wasil

[57] ABSTRACT

Disclosed is an assembly fixture and method useful for the assembly and fabrication of metal grids such as used to support and position the fissionable fuel rods of a nuclear fuel assembly. The grid assembly fixture uses a grid assembly plate (1) and a plurality of toggle clamp assemblies (9) and clamping pads (12) attached thereto to temporarily hold the four peripheral or border grid straps (7) in proper position and alignment against the four sides of the grid assembly plate (1). A strap retention assembly (13) is then placed around the four peripheral or border grid straps (7) to hold them in proper position and alignment during the further fabrication and welding of the grid straps (7).

7 Claims, 5 Drawing Sheets

1

ASSEMBLY FIXTURE AND METHOD FOR FABRICATING GRIDS

BACKGROUND OF THE INVENTION

This invention relates to an assembly fixture and method used for the fabrication of metal grids. It relates particularly to apparatus and a method used for the fabrication of metal grids used to support and position the fissionable fuel rods used in a nuclear reactor core.

Most nuclear reactors use as fuel, elongated rods of fissionable material arranged and supported in a spaced parallel array between upper and lower core support plates. To provide integrity within the supports, the fuel rods are divided into groups and the fuel rods in each group are formed as an integral fuel rod assembly prior to placement between the reactor core support plates.

More specifically, the fuel rods in each group have been typically in the past arranged in spaced, parallel arrangements with each other in supporting and spacing frames or grids. The grids are formed of a plurality of interconnected metal grid straps to provide a square or rectangular structural network of interconnected open grid cells, similar to an "egg crate divider".

U.S. Pat. Nos. 3,379,617 and 3,379,619 issued Apr. 23, 1968 to Andrew et al. and assigned to the assignee of the present invention, disclose typical supporting grid assemblies for fuel rods in which the fuel rods are held laterally and longitudinally in the grid cells by resilient, spring-like retainers in selected grid cells of the grid structure.

In the past the assembly of the grids has been difficult and time consuming due to the large number of grid strap components, their small size, the flexibility of the individual grid straps and the large number of welds required to connect all the grid straps and components together into an integral structural grid network.

In addition, the nuclear fuel assembly grid specifications require that the that the grid straps and other grid components be very accurately aligned, both during and after assembly and welding, in order to hold the group of fuel rods making up a fuel rod assembly in a precise, parallel alignment. Such accurate alignment was often difficult and time consuming to achieve with the previously known multi-step grid assembly and welding fixtures and practices used prior to this invention.

SUMMARY OF THE INVENTION

It is therefore an object of this invention to provide a grid assembly fixture and assembly method useful for the assembly and welding of grids used to support a fuel rod assembly used in a nuclear reactor.

It is a further object of this invention to provide a grid assembly fixture and assembly method useful for the assembly and welding of grids that provides for an easy but precise and accurate alignment and positioning of the thin grid straps, especially those used for the sides of the grid, during its assembly and welding.

It is a still further object of this invention to provide a grid assembly fixture and assembly method that allows for faster and more efficient grid assembly and welding procedures.

Other and further objects of this invention will become apparent from the following detailed description and the accompanying drawings and claims.

It has been discovered that the foregoing objects can be attained by a grid assembly fixture or apparatus for the assembly of a grid structure used to support elongate fuel rods for a nuclear reactor comprising a rectangular grid assembly plate supported above a work surface and having a flange on each four sides of the rectangular grid assembly plate. A clamp support plate attached to each side flange supports a toggle action clamp assembly that is able to move and hold an elongated clamping pad against each side of the grid assembly plate to hold temporarily hold the four border grid straps along the four sides of the grid assembly plate. A rectangular strap retention assembly is then placed around the border grid straps to hold the border grid straps in place against the four sides of the grid assembly plate until they can be welded together. The toggle clamps and associated clamping pads are then released.

DESCRIPTION OF THE PREFERRED EMBODIMENTS

Figure 1:
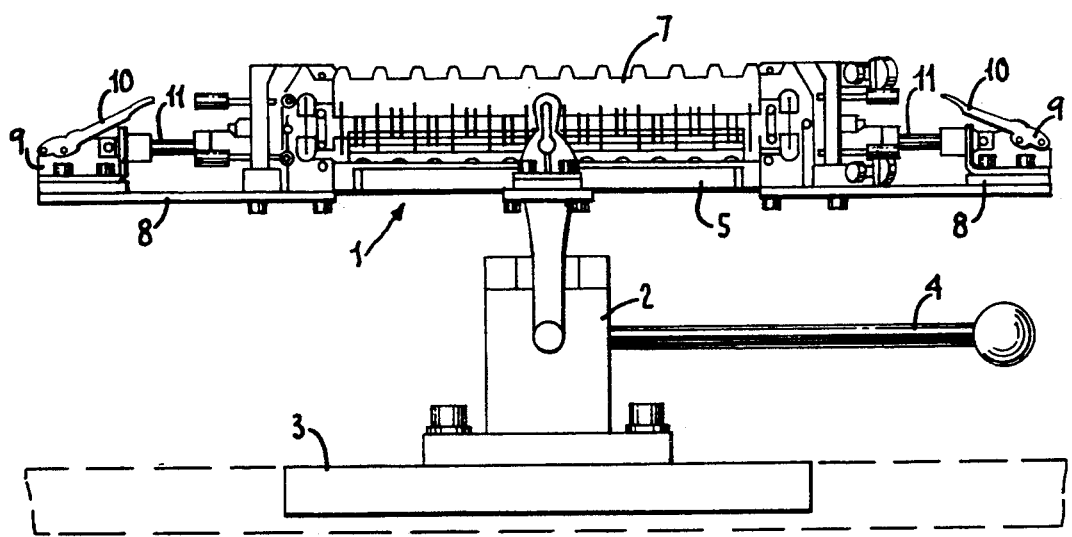
FIG. 1 is a elevational view of a preferred embodiment of the grid assembly fixture of this invention.

FIG. 1 illustrates an elevational view of a preferred embodiment of the grid assembly fixture of this invention. As shown in FIG. 1, the fixture is comprised of a rectangular grid assembly plate 1 mounted on a pedestal 2 attached to a work surface 3, such as a work bench. The pedestal 2 is adjustable using the handle 4, which allows the grid assembly plate to be raised or lowered or tilted relative to the work surface 3, and then locked in place to provide a position most comfortable to the person assembling the grid. A suitable pedestal 2 work positioner is the Model 24001 manufactured by Marshall Industries, Dayton, Ohio.

Figure 3:
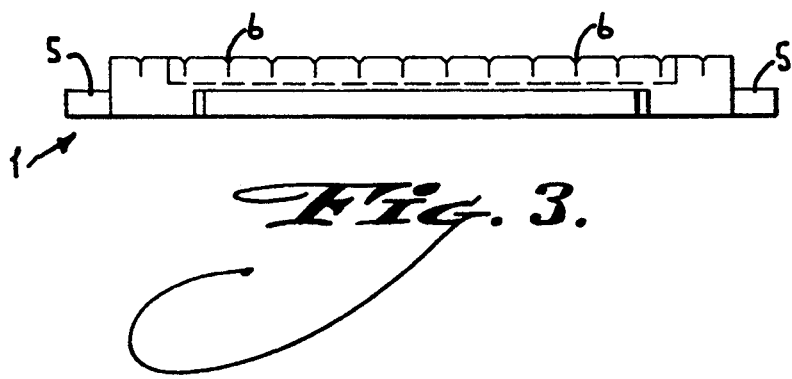
FIG. 3 is an elevational view of the grid assembly plate used in the preferred embodiment of the grid assembly fixture of this invention.
Figure 4:
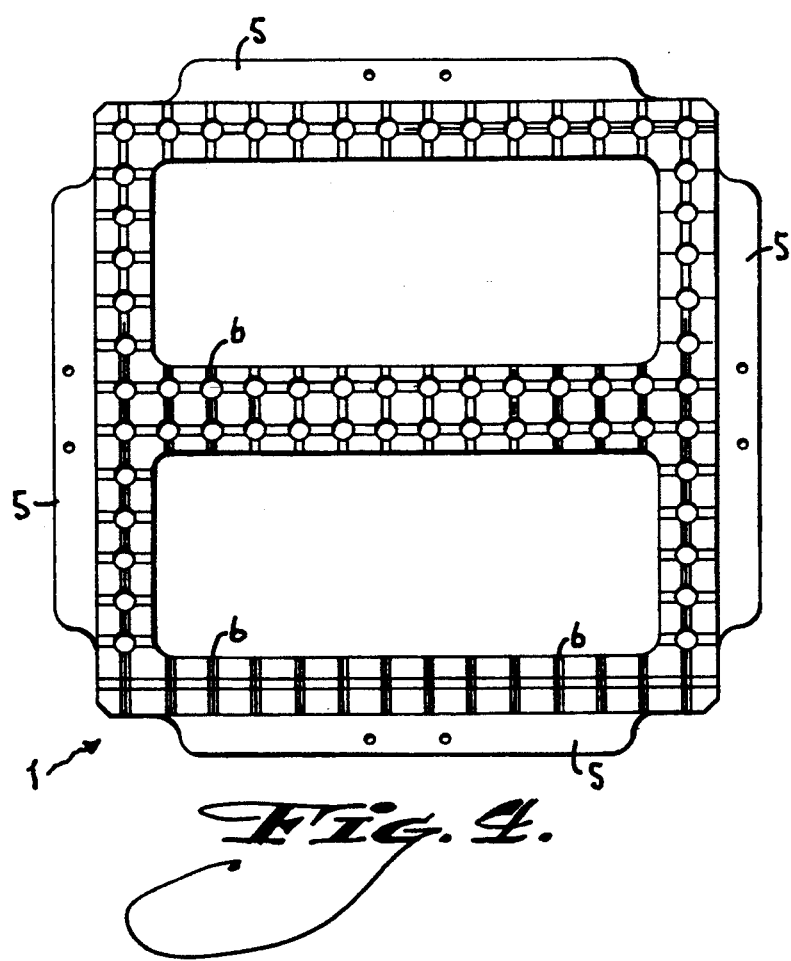
FIG. 4 is a top view of the grid assembly plate used in the preferred embodiment of the grid assembly fixture of this invention.

As best shown in FIGS. 3 and 4, the grid assembly plate 1 is a rectangular metal plate having four sides, each side having a flange 5 extending along a major portion of the length of each side. The top surface of the grid assembly plate is provided with a plurality of spaced slots 6 extending across the plate 1 in both directions. The slots 6 are adapted to receive the thin metal grid straps 7 that are interconnected at right angles to each other to form a network of interconnected grid cells similar to an "egg crate divider". The periphery or border of the grid is comprised of four grid straps 7 attached to each other and to the ends of the internal grid straps 7 to form a rectangular metal grid of interconnected open grid cells. The four border grid straps that make up the periphery of the grid are positioned along the four sides of the grid assembly plate 1 and are supported on the top surfaces of the four flanges 5, as illustrated in FIG. 1.

Figure 2:
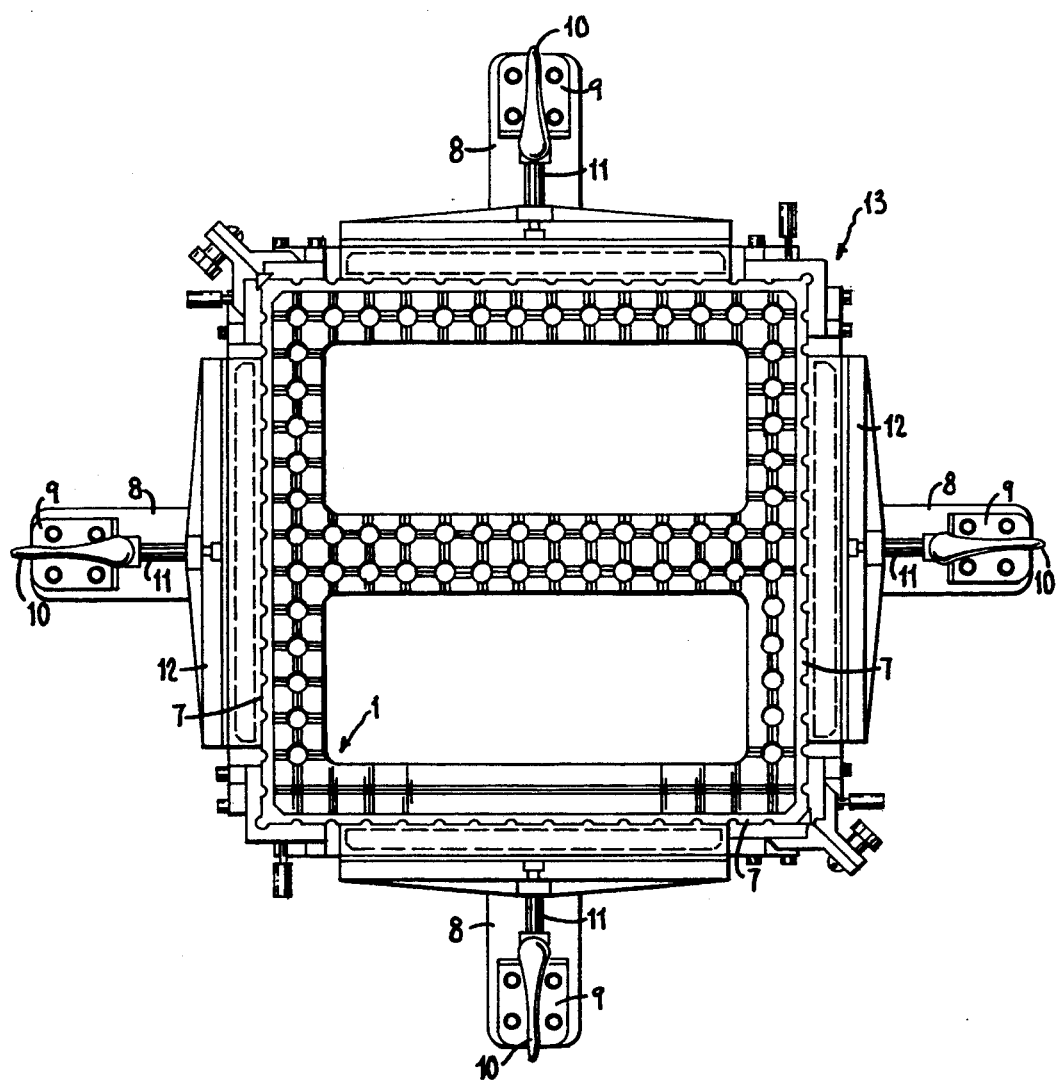
FIG. 2 is a top view of a preferred embodiment of the grid assembly fixture of this invention.

As shown in FIGS. 1 and 2, a clamp support plate 8 is attached to the underside of each flange 5 on the sides of the grid assembly plate 1 and projects outwardly away from the flange 5. A toggle action clamp assembly 9 is attached to the end of each clamp support plate 8. The toggle action clamp assembly 9 is a commercially available assembly by which movement of the handle 10 moves a spindle 11 inwardly or outwardly relative to the sides of the grid assembly plate 1. The movement of the toggle action clamp assembly handle 10 may be manual or by a pneumatic piston and cylinder. For this embodiment, a Model 601 toggle action clamp assembly manufactured by Destaco Division, Drover Corporation, Detroit, Mich. was used.

Figure 7:
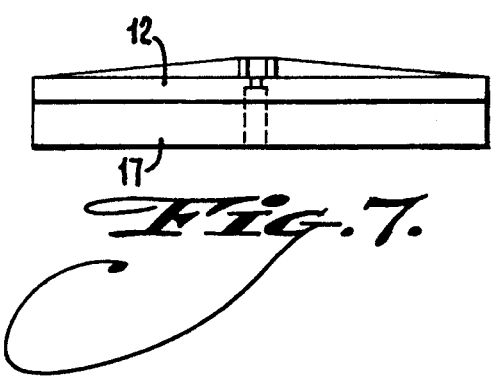
FIG. 7 is a top view of the clamping pad used in the preferred embodiment of the grid assembly fixture of this invention.
Figure 8:
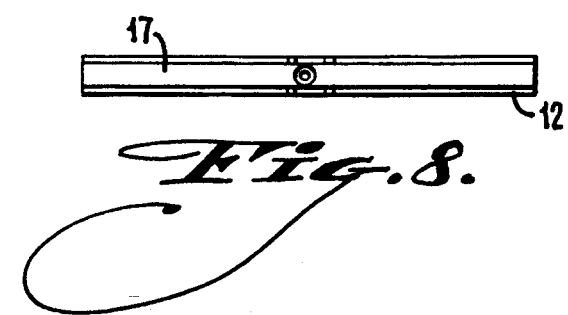
FIG. 8 is an elevational view of the clamping pad used in the preferred embodiment of the grid assembly fixture of this invention.

The end of the spindle 11 of each toggle action clamp assembly 9 is provided with an elongated clamping pad 12 adapted to move tightly against each of the sides of the grid assembly plate 1 just above the side flange 5. The clamping pad 12 is preferably about the length of the side flange 5 and preferably is provided with a face 17 for the clamping pad 12, as best illustrated in FIGS. 7 and 8.

The toggle action clamp assemblies 9 and the clamping pads 12 are designed to temporarily press against and hold the four peripheral or border grid straps 7 tightly in place against the four sides of the grid assembly plate 1 and against the ends of the interconnected internal grid straps 7. After the four peripheral or border grid straps 7 are held tightly in place using the toggle action clamp assemblies 9 and the clamping pads 12, a rectangular strap retention assembly 13 is placed around the outside of the four peripheral or border grid straps 7 to hold the peripheral or border grid straps 7 in the proper position for welding of the grid strap 7 connections. When the rectangular strap retention assembly 13 is tightly in place holding the four peripheral or border grip straps 7 tightly against the sides of the grid assembly plate 1, the toggle action clamp assemblies 9 are released allowing the clamping pads 12 to be withdrawn from contact with the peripheral or border grid straps 7.

Figure 5:
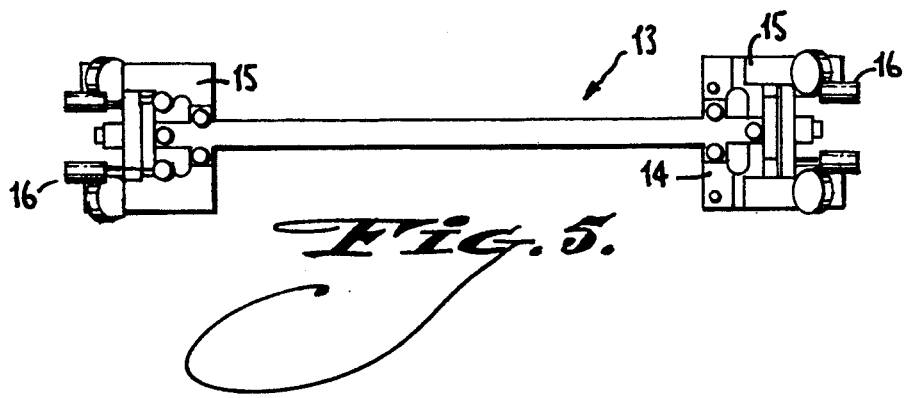
FIG. 5 is a elevational view of the retaining strap assembly used in the preferred embodiment of the grid assembly fixture of this invention.
Figure 6:
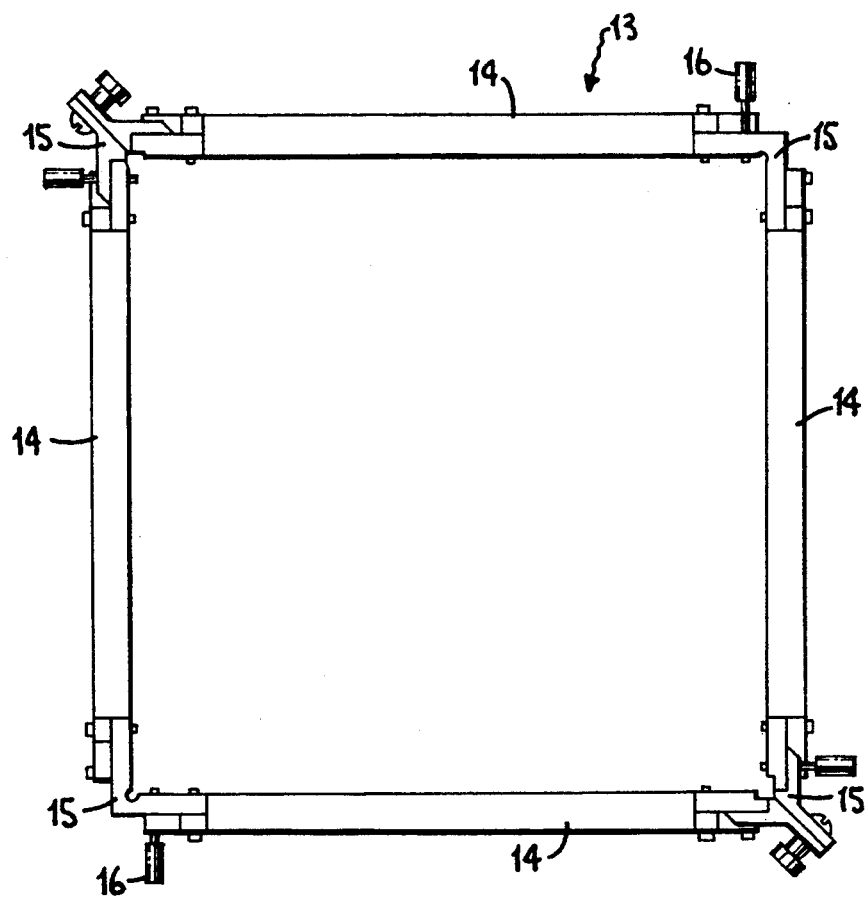
FIG. 6 is a top view of the retaining strap assembly used in the preferred embodiment of the grid assembly fixture of this invention.

As best illustrated in FIGS. 5 and 6, the rectangular strap retention assembly 13 is comprised of four rails 14 and four corner brackets 15 that allow the rails to be quickly connected to each other around the sides of the grid assembly plate 1 using openings in the corner brackets and knurled thumb screws 16. The clamping pads 12 are preferably provided with a face 17 for the clamping pad 12 that allows the rails 14 to be easily inserted through the face 17 of the clamping pads 12 while they are clamped against the border straps 7 and the sides of the grid assembly plate 1.

This invention allows the efficient assembly of nuclear fuel assembly grids and is readily adapted to the assembly of grids of any geometry or size. It also provides a more accurate and precise alignment of the grid straps and components for further fabrication and welding.

It is believed that the present invention and its advantages will be understood from the above description and the accompanying drawings and it will be apparent that changes may be made in the form, construction and arrangement of the apparatus of this invention without departing from the scope of this invention.

PARTS IDENTIFICATION LIST 1. grid assembly plate
2. pedestal
3. work surface
4. handle
5. flanges on grid assembly plate
6. slots on grid assembly plate
7. grid straps
8. clamp support plate
9. toggle action clamp assemblies
10. handle on clamp assemblies
11. spindle
12. clamping pad
13. strap retention assembly
14. rails
15. corner brackets
16. thumb screws
17. face of clamping pad (12)

I claim:

1. Apparatus for the assembly of a grid structure used to support elongated fuel rods for a nuclear reactor comprising
   (a) a rectangular grid assembly plate (1) supported above a work surface (3) and having a flange (5) on each side of the plate,
   (b) a clamp support plate (8) mounted to and projecting away from each flange (5) of the plate,
   (c) a toggle action clamp assembly (9) attached to each clamp support plate (8) adapted to move and hold a clamping pad (12) against a side of the plate (1) over the side flange (5).

2. The apparatus of claim 1 in which the grid assembly plate (1) is surrounded with a strap retention assembly (13).

3. The apparatus of claim 1 in which the grid assembly plate (1) is adjustable relative to the work surface (3).

4. The apparatus of claim 1 in which the toggle action clamp assemblies (9) are actuated manually.

5. The apparatus of claim 1 in which the toggle action clamp assemblies (9) are actuated pneumatically.

6. The apparatus of claim 1 in which the clamping pad (12) is substantially the length of the side flange (5).

7. A method for assembling a grid used to support elongated fuel rods in a nuclear reactor comprising;
   (a) placing a plurality of grid straps (7) around the sides of a rectangular grid assembly plate (1),
   (b) temporarily holding the grid straps (7) against the sides of the rectangular grid assembly plate (1) using a toggle clamp assembly (9) attached to each side of the plate (1),
   (c) placing a strap retention assembly (13) around the grid straps (7) to hold the grid straps (7) tightly against the sides of the plate (1),
   (d) releasing the toggle clamp assemblies (9) from contact with the grid straps (7),
   (e) welding the grid straps (7) together,
   (f) removing the strap retention assembly (13) from around the welded grid straps (7).

* * * * *